United States Patent [19]

Aldrich et al.

[11] Patent Number: 4,555,162

[45] Date of Patent: Nov. 26, 1985

[54] METHOD OF FABRICATING LONG PERIOD OPTICAL GRATING

[75] Inventors: Ralph E. Aldrich, Acton; Steven M. Daigneault, Rockland, both of Mass.

[73] Assignee: Itek Corporation, Lexington, Mass.

[21] Appl. No.: 586,175

[22] Filed: Mar. 5, 1984

[51] Int. Cl.⁴ .............................................. G02B 5/18
[52] U.S. Cl. ..................... 350/162.17; 350/162.11; 350/320; 228/160; 228/194; 29/411; 29/157.3 R
[58] Field of Search .............. 350/320, 162.11, 162.17, 350/162.18, 162.19, 162.20, 162.21, 162.22, 162.23, 162.24; 228/160, 194, 185; 29/411, 157.3 R; 427/162

[56] References Cited

U.S. PATENT DOCUMENTS 4,114,978 9/1978 Bostick et al. ................. 350/162.23
4,142,006 2/1979 Choyke et al. ..................... 427/162
4,476,161 10/1984 Pohle et al. ..................... 350/162.17

Primary Examiner—John K. Corbin
Assistant Examiner—Bruce S. Shapiro
Attorney, Agent, or Firm—Michael H. Wallach; Robert F. Rotella

[57] ABSTRACT

A long period buried optical grating is fabricated by polishing a number of single crystal silicon wafers to identical thicknesses and flat figure, applying a light reflective metallic coating to the wafers, thereafter bonding the wafers together in a stack, and thereafter lapping the resulting stack of bonded layers at an acute angle with respect to the major planar surfaces of the wafers to form the buried grating, such grating having optically flat reflective sawtoothed elements. The grating period may be readily controlled by changing the acute angle and/or the thickness of the silicon wafers.

19 Claims, 3 Drawing Figures

METHOD OF FABRICATING LONG PERIOD OPTICAL GRATING

BACKGROUND OF THE INVENTION

It has been deemed desirable to illuminate a distant object with a light beam generated by a high energy laser (H.E.L.). The laser light beam is directed at a high energy light beam reflector and a particular wavelength component thereof reflects off of the reflector and is directed at the distant target. The reflected light energy from the illuminated target is redirected along the same path as the transmitted beam, and is separated by a light separator which redirects the reflected beam along a different optical axis than the optical axis of the light energy coming from the laser and striking the reflector. Such a prior art light separator is illustrated in FIG. 1 wherein the illuminating beam 1 from the high energy laser impinges upon the reflector surface 2, and a particular wavelength component is projected along path 3 toward the target. The reflected beam from the distant target transverses path 4 and impinges upon a sawtooth reflective structure 5 which is positioned beneath the reflective layer 2, and such reflected energy is redirected along path 6 to a detector system, not shown. The return beam, which has a different wavelength than the outgoing H.E.L. beam, is either a thermal beam or a return from an illuminator. Because the light separator of FIG. 1 is subjected to high temperature levels due to being impinged upon by the high energy laser light, heat exchanger 7 is positioned beneath the sawtooth reflective structure 5 to draw off the heat generated. Portion 8 of the light separator is typically formed of zinc selenide, and heat exchanger 7 comprises a copper or molybdenum block having fluid containing cooling pipes 9 buried therein, to draw the heat away from the light separator.

The reflective long period grating 5 shown in FIG. 1 is difficult to form and polish, and the formation of optically flat reflective sawtooth portions thereof has not been attainable. Thus it is highly desirable to produce a similar but superior device in a simpler and more inexpensive manner for performing these functions.

SUMMARY OF THE INVENTION

In accordance with a preferred method of the present invention, a long period buried grating, which performs the above stated functions, is produced by polishing a plurality of single crystal silicon wafers to identical thicknesses and flatness and applying a light reflective metallic surface to one side of the wafers; thereafter bonding the wafers together in a stack; and thereafter lapping the stack at an acute angle with respect to the major planar surfaces of the now bonded stack to form the grating. One side of the resulting grating is thereafter preferably affixed to a heat exchanger, and an amorphous silicon layer is preferably applied to the opposite side thereof, and a high energy laser reflector is thereafter coated over the amorphous silicon layer. This fabrication technique is far simpler than other methods previously proposed for producing the buried gratings employed to carry out the above mentioned light separation function, and produces a superior product having optically flat sawtooth reflectors.

Other objects, features, and advantages of the present invention will become apparent upon study of the following detailed description, taken in conjunction with the drawings in which.

DETAILED DESCRIPTION

Figure 1:
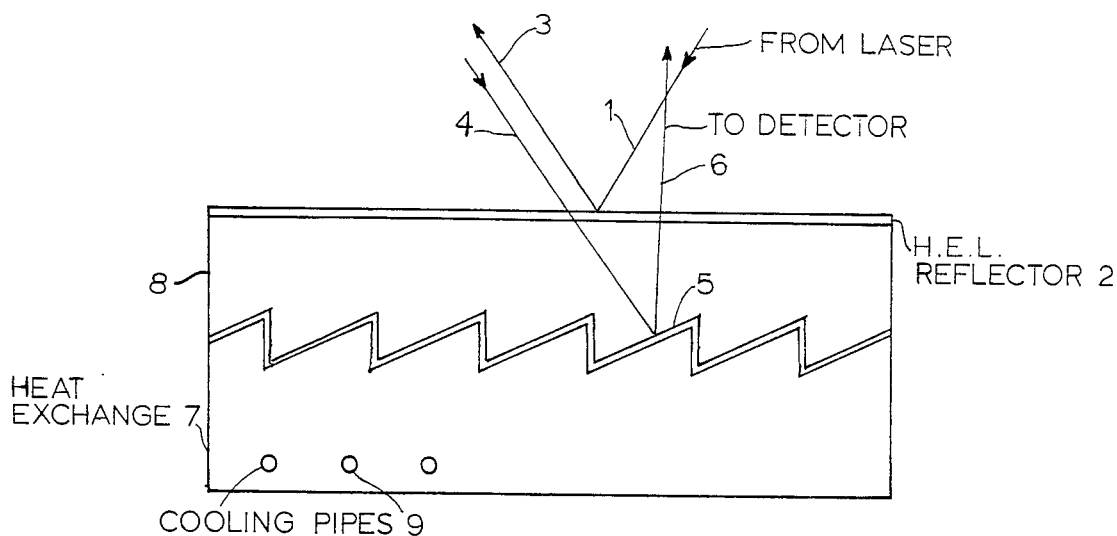
FIG. 1 illustrates the above mentioned prior art light separator.
Figure 2:
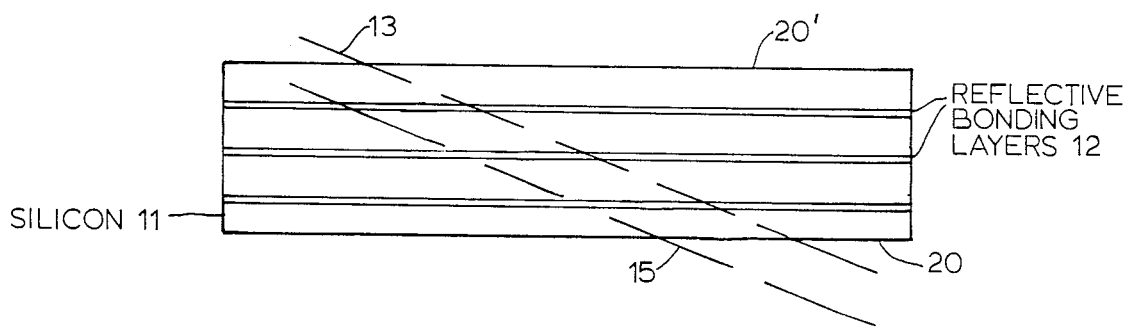
FIG. 2 illustrates the stacked wafers before lapping.
Figure 3:
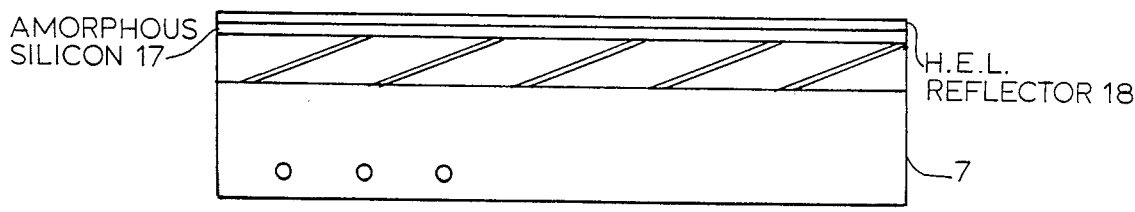
FIG. 3 illustrates the final product including the long period buried grating structure.

Difficulties involved in forming and polishing the buried grating of FIG. 1 are eliminated by cutting a number of reflective layer support elements, preferably silicon wafers, from a single crystal, and polishing the wafers to identical thicknesses and flatness. The wafers are thereafter metalized to produce reflective coatings thereon, and thereafter bonded into a stack, preferably employing a diffusion bonded gold layer, such a stack being illustrated in FIG. 2, showing the silicon layers 11 and the reflective bonding layers 12. The bonded stack is thereafter cut along skewed lines 13 and 15 to produce the buried grating structure 16 illustrated in FIG. 3. The cutting and lapping process produces smooth, flat surfaces of the buried grating body 16. An amorphous silicon layer 17 is applied over the grating, and a H.E.L. reflector layer 18 is formed over the silicon layer. The lower portion of the buried grating body 16 is affixed to heat exchanger 7 and the result is a light separator having buried, optically flat surfaces with a readily controllable grating period. The period of the grating may be altered by changing the acute angle of cut along lines 13 and 15 with respect to the planar surfaces 20 of the wafers. Changing the thickness of the silicon layers between the reflective layers will also result in a change of the period of the grating, so that considerable flexibility is obtained in terms of establishing the grating period.

A typical long period buried grating made in accordance with this invention, will have a period of 1 cm, a thickness of 0.5 mm and an overall diameter of 10 cm. The power handling capacity of this device is determined by the thermal conductivity and thermal expansion coefficient of the material comprising the grating, and the overall thickness. For this reason, gratings should be thin (less than 1 mm) for high power operation, and silicon is preferred to, for example, ZnSe in the 2-10 um wavelength range of the return beam, since silicon has a high thermal conductivity and a low thermal expansion coefficient. For use with visible light, one would use sapphire ($Al_2O_3$), for example, to obtain transmission at short wavelengths. Other materials can be selected based on the specific system requirements.

While specific steps have been described, others may be employed, and thus the invention is to be limited only by the scope of the following claims and equivalents.

We claim:

1. A method of fabricating a long period optical grating device comprising the steps of:
    providing a plurality of support elements having planar surfaces;
    producing light reflective surfaces upon the planar surfaces of said support elements;
    thereafter bonding said support elements together in a stack; and
    thereafter cutting said stack at an acute angle with respect to the planar surfaces of said support elements and lapping said stack to form said grating.

2. The method as set forth in claim 1 wherein the bonding of said support elements together employs diffusion bonding of gold layers.

3. The method as set forth in claim 1 further including the step of bonding said grating to a heat exchanger after lapping.

4. The method as set forth in claim 2 further including the step of bonding said grating to a heat exchanger after lapping.

5. The method as set forth in claims 1, 2, 3 or 4 further including the step of applying an additional light reflective layer over said grating.

6. A method of fabricating a long period optical grating device comprising the steps of:
   polishing the planar surfaces of a plurality of reflector support elements so that said elements have identical thicknesses and flat figure;
   producing flat light reflective surfaces upon the planar surfaces of said support elements;
   thereafter bonding said support elements together in a stack; and
   thereafter cutting said stack at an acute angle with respect to said planar surfaces of said support elements and lapping said stack to form said grating.

7. The method as set forth in claim 6 wherein the bonding of said support elements together employs diffusion bonding of gold layers.

8. The method as set forth in claim 6 further including the step of bonding said grating to a heat exchanger after lapping.

9. The method as set forth in claim 7 further including bonding said grating to a heat exchanger after lapping.

10. The method as set forth in claims 6, 7, 8 or 9, further including the step of applying an additional light reflective layer over said grating.

11. A method of fabricating a long period optical grating device comprising the steps of:
   polishing a plurality of single crystal silicon wafers having major planar surfaces, to identical thicknesses and flat figure;
   applying a light reflective coating to the planar surfaces of said wafers;
   thereafter bonding said wafers together in a stack; and
   thereafter cutting said stack at an acute angle with respect to the major planar surfaces of said wafers and lapping said stack to form said grating.

12. The method as set forth in claim 11 wherein the bonding of said wafers together employs diffusion bonding of gold layers.

13. The method as set forth in claim 11 further including the step of bonding said grating to a heat exchanger after lapping.

14. The method as set forth in claim 12 further including bonding said grating to a heat exchanger after lapping.

15. The method as set forth in claims 11, 12, 13 or 14 further including the steps of depositing a layer of amorphous silicon over said grating and then applying an additional light reflective layer over said layer of amorphous silicon.

16. The method as set forth in claim 11 further including the step of applying an additional light reflective layer over said grating.

17. The method as set forth in claim 12 further including the step of applying an additional light reflective layer over said grating.

18. The method as set forth in claim 13 further including the step of applying an additional light reflective layer over said grating.

19. The method as set forth in claim 14 further including the step of applying an additional light reflective layer over said grating.

* * * * *